(12) United States Patent　　(10) Patent No.: US 9,424,524 B2
Dave et al.　　(45) Date of Patent: Aug. 23, 2016

(54) EXTRACTING FACTS FROM UNSTRUCTURED TEXT

(71) Applicant: QBASE, LLC, Reston, VA (US)

(72) Inventors: Rakesh Dave, Dayton, OH (US); Sanjay Boddhu, Dayton, OH (US)

(73) Assignee: QBASE, LLC, Reston, VA (US)

( * ) Notice: Subject to any disclaimer, the term of this patent is extended or adjusted under 35 U.S.C. 154(b) by 0 days.

(21) Appl. No.: 14/557,802

(22) Filed: Dec. 2, 2014

(65) Prior Publication Data

US 2015/0154193 A1　Jun. 4, 2015

Related U.S. Application Data

(60) Provisional application No. 61/910,880, filed on Dec. 2, 2013.

(51) Int. Cl.
*G06F 17/30*　(2006.01)
*G06N 7/00*　(2006.01)
*G06F 17/27*　(2006.01)

(52) U.S. Cl.
CPC .......... *G06N 7/005* (2013.01); *G06F 17/3053* (2013.01); *G06F 17/30705* (2013.01); *G06F 17/2765* (2013.01)

(58) Field of Classification Search
CPC .......... G06F 17/2765; G06F 17/3053
See application file for complete search history.

(56) References Cited

U.S. PATENT DOCUMENTS

| 6,128,660 | A  | 10/2000 | Grimm et al. |
|---|---|---|---|
| 6,178,529 | B1 | 1/2001 | Short et al. |
| 6,266,781 | B1 | 7/2001 | Chung et al. |
| 6,353,926 | B1 | 3/2002 | Parthesarathy et al. |
| 6,738,759 | B1 | 5/2004 | Wheeler et al. |
| 6,832,737 | B2 | 12/2004 | Karlsson et al. |
| 7,058,846 | B1 | 6/2006 | Kelkar et al. |
| 7,370,323 | B2 | 5/2008 | Marinelli et al. |
| 7,421,478 | B1 | 9/2008 | Muchow |
| 7,447,940 | B2 | 11/2008 | Peddada |
| 7,543,174 | B1 | 6/2009 | van Rietschote et al. |
| 7,681,075 | B2 | 3/2010 | Havemose et al. |
| 7,818,615 | B2 | 10/2010 | Krajewski et al. |
| 7,899,871 | B1 | 3/2011 | Kumar et al. |
| 8,055,933 | B2 | 11/2011 | Jaehde et al. |
| 8,090,717 | B1 | 1/2012 | Bharat et al. |
| 8,122,026 | B1 | 2/2012 | Laroco et al. |
| 8,122,047 | B2 | 2/2012 | Kanigsberg et al. |

(Continued)

FOREIGN PATENT DOCUMENTS

WO　2013/003770 A2　1/2013

OTHER PUBLICATIONS

Gjergji Kasneci et al., "NAGA: Searching and Ranking Knowledge", (2008) IEEE ICDE, pp. 953-962.*

(Continued)

*Primary Examiner* — Scott A Waldron
(74) *Attorney, Agent, or Firm* — Eric L. Sophir; Dentons US LLP

(57) ABSTRACT

A system and method for extracting facts from unstructured text files are disclosed. Embodiments of the disclosed system and method may receive a text file as input and perform extraction and disambiguation of entities, as well as extract topics and facts. The facts are extracted by comparing against a fact template store and associating facts with events or topics. The extracted facts are stored in a data store.

17 Claims, 3 Drawing Sheets

(56) References Cited

U.S. PATENT DOCUMENTS

| | | | |
|---|---|---|---|
| 8,265,925 B2* | 9/2012 | Aarskog | 704/9 |
| 8,341,622 B1 | 12/2012 | Eatough | |
| 8,345,998 B2 | 1/2013 | Malik et al. | |
| 8,356,036 B2 | 1/2013 | Bechtel et al. | |
| 8,375,073 B1 | 2/2013 | Jain | |
| 8,423,522 B2 | 4/2013 | Lang et al. | |
| 8,429,256 B2 | 4/2013 | Vidal et al. | |
| 8,645,298 B2 | 2/2014 | Hennig et al. | |
| 8,726,267 B2 | 5/2014 | Li et al. | |
| 8,782,018 B2 | 7/2014 | Shim et al. | |
| 8,972,396 B1 | 3/2015 | Zhang et al. | |
| 8,995,717 B2 | 3/2015 | Cheng et al. | |
| 9,009,153 B2 | 4/2015 | Khan et al. | |
| 9,025,892 B1 | 5/2015 | Lightner et al. | |
| 9,032,387 B1 | 5/2015 | Hill et al. | |
| 9,177,254 B2 | 11/2015 | Boddhu et al. | |
| 9,177,262 B2 | 11/2015 | Lightner et al. | |
| 9,239,875 B2 | 1/2016 | Lightner et al. | |
| 2001/0037398 A1 | 11/2001 | Chao et al. | |
| 2002/0031260 A1 | 3/2002 | Thawonmas et al. | |
| 2002/0052730 A1 | 5/2002 | Nakao | |
| 2002/0099700 A1 | 7/2002 | Li | |
| 2002/0165847 A1 | 11/2002 | McCartney et al. | |
| 2002/0174138 A1 | 11/2002 | Nakamura | |
| 2003/0028869 A1 | 2/2003 | Drake et al. | |
| 2003/0112792 A1 | 6/2003 | Cranor et al. | |
| 2003/0158839 A1 | 8/2003 | Faybishenko et al. | |
| 2003/0182282 A1 | 9/2003 | Ripley | |
| 2004/0027349 A1 | 2/2004 | Landau et al. | |
| 2004/0049478 A1 | 3/2004 | Jasper et al. | |
| 2004/0143571 A1 | 7/2004 | Bjornson et al. | |
| 2004/0153869 A1 | 8/2004 | Marinelli et al. | |
| 2004/0205064 A1 | 10/2004 | Zhou et al. | |
| 2004/0215755 A1 | 10/2004 | O'Neill | |
| 2004/0243645 A1 | 12/2004 | Broder et al. | |
| 2005/0154701 A1* | 7/2005 | Parunak et al. | 707/1 |
| 2005/0192994 A1 | 9/2005 | Caldwell et al. | |
| 2006/0101081 A1 | 5/2006 | Lin et al. | |
| 2006/0294071 A1 | 12/2006 | Weare et al. | |
| 2007/0005639 A1 | 1/2007 | Gaussier et al. | |
| 2007/0156748 A1 | 7/2007 | Emam et al. | |
| 2007/0203693 A1 | 8/2007 | Estes | |
| 2007/0203924 A1 | 8/2007 | Guha et al. | |
| 2007/0240152 A1 | 10/2007 | Li et al. | |
| 2007/0250519 A1 | 10/2007 | Fineberg et al. | |
| 2007/0282959 A1 | 12/2007 | Stern | |
| 2008/0010683 A1 | 1/2008 | Baddour et al. | |
| 2008/0027920 A1 | 1/2008 | Schipunov et al. | |
| 2008/0077570 A1 | 3/2008 | Tang et al. | |
| 2008/0109399 A1 | 5/2008 | Liao | |
| 2009/0019013 A1 | 1/2009 | Tareen et al. | |
| 2009/0043792 A1 | 2/2009 | Barsness et al. | |
| 2009/0049038 A1 | 2/2009 | Gross | |
| 2009/0089626 A1 | 4/2009 | Gotch et al. | |
| 2009/0094484 A1 | 4/2009 | Son et al. | |
| 2009/0222395 A1 | 9/2009 | Light et al. | |
| 2009/0240682 A1 | 9/2009 | Balmin et al. | |
| 2009/0292660 A1 | 11/2009 | Behal et al. | |
| 2009/0299999 A1 | 12/2009 | Loui et al. | |
| 2009/0322756 A1 | 12/2009 | Robertson et al. | |
| 2010/0077001 A1 | 3/2010 | Vogel et al. | |
| 2010/0100437 A1 | 4/2010 | Dean et al. | |
| 2010/0138931 A1 | 6/2010 | Thorley et al. | |
| 2010/0223264 A1 | 9/2010 | Bruckner et al. | |
| 2010/0235311 A1 | 9/2010 | Cao et al. | |
| 2010/0274785 A1 | 10/2010 | Procopiuc et al. | |
| 2011/0071975 A1 | 3/2011 | Friedlander et al. | |
| 2011/0093471 A1 | 4/2011 | Brockway et al. | |
| 2011/0119243 A1 | 5/2011 | Diamond et al. | |
| 2011/0125764 A1 | 5/2011 | Carmel et al. | |
| 2011/0161333 A1 | 6/2011 | Langseth et al. | |
| 2011/0282888 A1 | 11/2011 | Koperski et al. | |
| 2011/0296397 A1 | 12/2011 | Vidal et al. | |
| 2012/0016877 A1 | 1/2012 | Vadrevu et al. | |
| 2012/0030220 A1 | 2/2012 | Edwards et al. | |
| 2012/0059839 A1 | 3/2012 | Andrade et al. | |
| 2012/0102121 A1 | 4/2012 | Wu et al. | |
| 2012/0117069 A1 | 5/2012 | Kawanishi et al. | |
| 2012/0131139 A1 | 5/2012 | Siripurapu et al. | |
| 2012/0143911 A1 | 6/2012 | Liebald et al. | |
| 2012/0246154 A1 | 9/2012 | Duan et al. | |
| 2012/0310934 A1 | 12/2012 | Peh et al. | |
| 2012/0323839 A1 | 12/2012 | Kiciman et al. | |
| 2012/0330946 A1* | 12/2012 | Arredondo et al. | 707/728 |
| 2013/0036076 A1 | 2/2013 | Yang et al. | |
| 2013/0132405 A1 | 5/2013 | Bestgen et al. | |
| 2013/0166480 A1 | 6/2013 | Popescu et al. | |
| 2013/0166547 A1 | 6/2013 | Pasumarthi et al. | |
| 2013/0290232 A1 | 10/2013 | Tsytsarau et al. | |
| 2013/0303198 A1 | 11/2013 | Sadasivam et al. | |
| 2014/0013233 A1 | 1/2014 | Ahlberg et al. | |
| 2014/0022100 A1 | 1/2014 | Fallon et al. | |
| 2014/0156634 A1 | 6/2014 | Buchmann et al. | |
| 2014/0201180 A1* | 7/2014 | Fatourechi et al. | 707/706 |
| 2014/0229476 A1 | 8/2014 | Fouad et al. | |
| 2014/0244550 A1 | 8/2014 | Jin et al. | |
| 2014/0280183 A1 | 9/2014 | Brown et al. | |
| 2014/0351233 A1 | 11/2014 | Crupi et al. | |
| 2015/0074037 A1 | 3/2015 | Sarferaz | |
| 2015/0154079 A1 | 6/2015 | Lightner et al. | |
| 2015/0154264 A1 | 6/2015 | Lightner et al. | |
| 2015/0154297 A1 | 6/2015 | Lightner et al. | |

OTHER PUBLICATIONS

International Search Report dated Apr. 15, 2015 corresponding to International Patent Application No. PCT/US2014/067994, 4 pages.

Written Opinion of the International Searching Authority dated Apr. 15, 2015 corresponding to International Patent Application No. PCT/US2014/067994, 9 pages.

International Search Report and Written Opinion dated Mar. 6, 2015 corresponding to International Patent Application No. PCT/US2014/067993, 9 pages.

International Search Report and Written Opinion dated Mar. 10, 2015 corresponding to International Patent Application No. PCT/US2014/067999, 10 pages.

International Search Report and Written Opinion of the International Searching Authority dated Apr. 15, 2015 corresponding to International Patent Application No. PCT/US2014/068002, 10 pages.

International Search Report and Written Opinion dated Feb. 24, 2015 corresponding to International Patent Application No. PCT/US2014/067918, 10 pages.

International Search Report and Written Opinion dated Mar. 3, 2015 corresponding to International Patent Application No. PCT/US2014/067921, 10 pages.

Wang, C., et al., "Automatic Online News Issue Construction in Web Environment," Tsinghuya Univ., Beijing, China, 2008, pp. 457-466.

Blei, D.M., et al., "Latent Dririchlet Allocation," Journal of Machine Learning Research, vol. 3, 2003, pp. 993-1022.

Chuan, S.L., et al., "A Practical Web-based Approach to Generating Topic Hierarchy for Text Segments," Institute of Information Science, Academia Sinica, Taiwan, R.O.C., 2004, pp. 127-136.

Tunkelang, D. "Faceted Search," Morgan & Claypool Publ., 2009, pp. i-79.

Schuth, A., et al., "University of Amsterdam Data Centric Ad Hoc Faceted Search Runs," ISLA, 2012, pp. 155-160.

Tools, Search Query Suggestions using ElasticSearch via Shingle Filter and Facets, Nov. 2012, pp. 1-12.

Jorg Becker et al., "Topic-based Vector Space Model", Business Information Systems, Proceedings of BIS 2003, Colorado Springs, USA, 6 pages.

* cited by examiner

EXTRACTING FACTS FROM UNSTRUCTURED TEXT

CROSS-REFERENCE TO RELATED APPLICATIONS

This application claims the benefit of U.S. Provisional Application No. 61/910,880, filed Dec. 2, 2013, entitled "System and Method for Extracting Facts From Unstructured Text," which is incorporated herein in its entirety, which hereby incorporated in its entirety herein.

This application is related to U.S. patent application Ser. No. 14/557,794, entitled "Method for Disambiguating Features in Unstructured Text," filed Dec. 2, 2014; U.S. patent application Ser. No. 14/558,300, entitled "Event Detection Through Text Analysis Using Trained Event Template Models," filed Dec. 2, 2014; U.S. patent application Ser. No. 14/558,076, entitled "METHOD FOR AUTOMATED DISCOVERY OF NEW TOPICS," filed Dec. 2, 2014; and U.S. patent application Ser. No. 14/558,342, entitled "EVENT DETECTION THROUGH TEXT ANALYSIS USING DYNAMIC SELF EVOLVING/LEARNING MODULE," filed Dec. 2, 2014; each of which are incorporated herein by reference in their entirety.

TECHNICAL FIELD

The present disclosure relates in general to information data mining from document sources, and more specifically to extraction of facts from documents.

BACKGROUND

Electronic document corpora may contain vast amounts of information. For a person searching for specific information in a document corpus, identifying key information may be troublesome. Manually crawling each document and highlighting or extracting important information may even be impossible depending on the size of the document corpus. At times a reader may only be interested in facts or asserted information. The use of intelligent computer systems for extracting features in an automated matter may be commonly used to aid in fact extraction. However, current intelligent systems fail to properly extract facts and associate them with other extracted features such as entities, topics, events and other feature types.

Thus a need exists for a method of extracting facts and accurately associating them with features to improve accuracy of information.

SUMMARY

A system and method for extracting facts from unstructured text are disclosed. The system includes an entity extraction computer module used to extract and disambiguate independent entities from an electronic document, such as a text file. The system may further include a topic extractor computer module configured to determine a topic related to the text file. The system may extract possible facts described in the text by comparing text string structures against a fact template store. The fact template store may be built by revising documents containing facts and recording a commonly used fact sentence structure. The extracted facts may then be associated with extracted entities and topics to determine a confidence score that may serve as an indication of the accuracy of the fact extraction.

In one embodiment, a method is disclosed. The method comprises receiving, by an entity extraction computer, an electronic document having unstructured text and extracting, by the entity extraction computer, an entity identifier from the unstructured text in the electronic document. The method further includes extracting, by a topic extraction computer, a topic identifier from the unstructured text in the electronic document, and extracting, by a fact extraction computer, a fact identifier from the unstructured text in the electronic document by comparing text string structures in the unstructured text to a fact template database, the fact template database having stored therein a fact template model identifying keywords pertaining to specific fact identifiers and corresponding keyword weights. The method further includes associating, by a fact relatedness estimator computer, the entity identifier with the topic identifier and the fact identifier to determine a confidence score indicative of a degree of accuracy of extraction of the fact identifier.

In another embodiment, a system is disclosed. The system comprises one or more server computers having one or more processors executing computer readable instructions for a plurality of computer modules. The computer modules include an entity extraction module configured to receive an electronic document having unstructured text and extract an entity identifier from the unstructured text in the electronic document, a topic extraction module configured to extract a topic identifier from the unstructured text in the electronic document, and a fact extraction module configured to extract a fact identifier from the unstructured text in the electronic document by comparing text string structures in the unstructured text to a fact template database, the fact template database having stored therein a fact template model identifying keywords pertaining to specific fact identifiers and corresponding keyword weights. The system further includes a fact relatedness estimator module configured to associate the entity identifier with the topic identifier and the fact identifier to determine a confidence score indicative of a degree of accuracy of extraction of the fact identifier.

In yet another embodiment, a non-transitory computer readable medium having stored thereon computer executable instructions. The instructions comprise receiving, by an entity extraction computer, an electronic document having unstructured text, extracting, by the entity extraction computer, an entity identifier from the unstructured text in the electronic document, and extracting, by a topic extraction computer, a topic identifier from the unstructured text in the electronic document. The instructions further include extracting, by a fact extraction computer, a fact identifier from the unstructured text in the electronic document by comparing text string structures in the unstructured text to a fact template database, the fact template database having stored therein a fact template model identifying keywords pertaining to specific fact identifiers and corresponding keyword weights, and associating, by a fact relatedness estimator computer, the entity identifier with the topic identifier and the fact identifier to determine a confidence score indicative of a degree of accuracy of extraction of the fact identifier.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
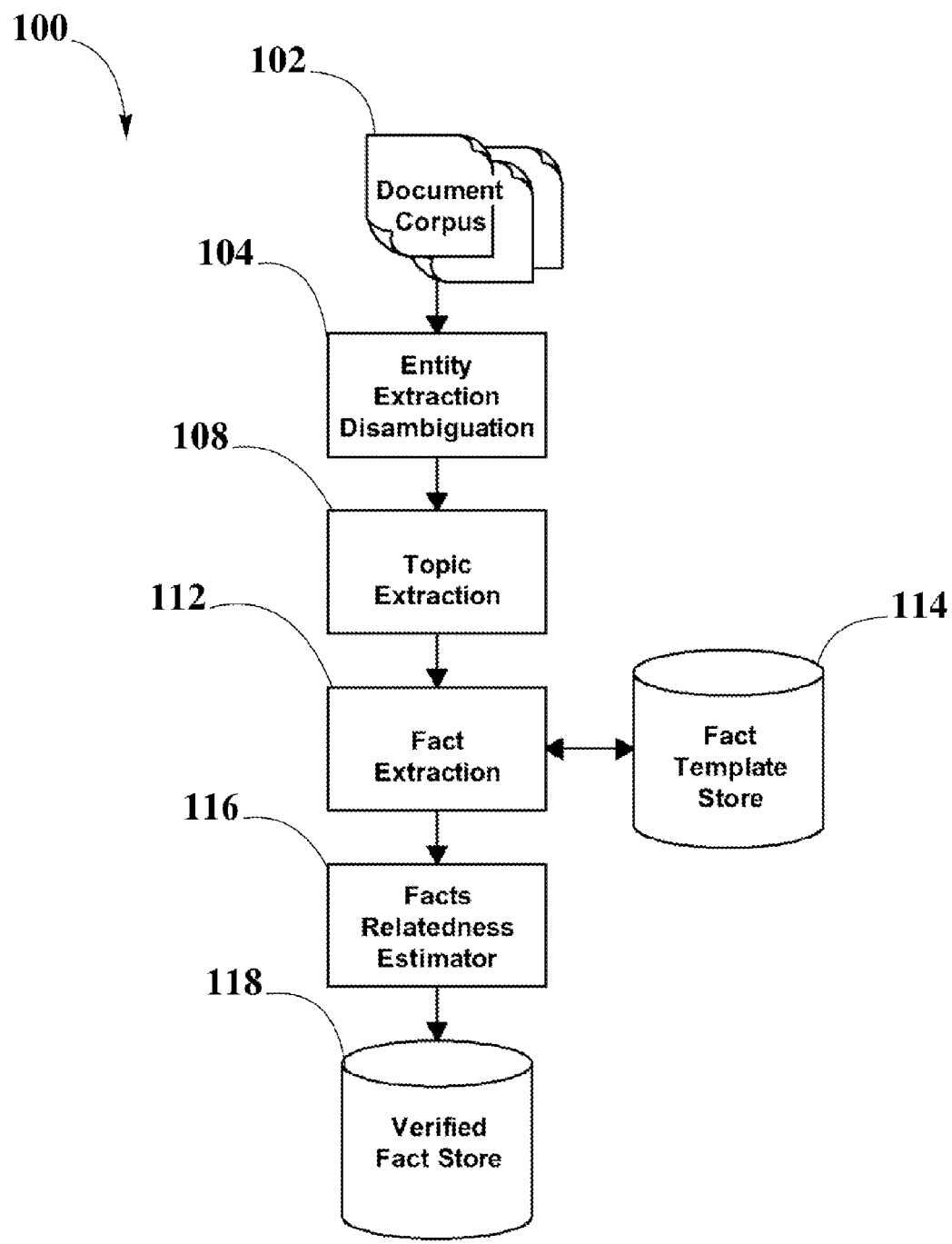
FIG. 1 is a diagram of a fact extraction system, according to an embodiment.

The present disclosure is herein described in detail with reference to embodiments illustrated in the drawings, which form a part hereof. Other embodiments may be used and/or other changes may be made without departing from the spirit or scope of the present disclosure. The illustrative embodiments described in the detailed description are not meant to be limiting of the subject matter presented herein.

As used herein, the following terms have the following definitions:

"Entity extraction" refers to information processing methods for extracting information such as names, places, and organizations from electronic documents.

"Corpus" refers to a collection of one or more electronic documents.

"Features" is any information which is at least partially derived from an electronic document.

"Module" refers to computer hardware and/or software components suitable for carrying out at least one or more tasks.

"Facts" refers to asserted information about features found in an electronic document.

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are to be considered within the scope of the invention.

The present disclosure describes a system and method for detecting, extracting and validating facts from a document source.

Various embodiments of the systems and methods disclosed here collect data from different sources in order to identify independent events. Embodiments of the present disclosure introduce a framework for extracting facts from unstructured text. The embodiments disclosed herein accurately associate extracted facts with other features (like topics, linguistic features, disambiguated entities and disambiguated entity types) retrieved from the text and employ a fact template store containing commonly used fact sentence structures. This approach allows the assignment of confidence scores to extracted facts and leads to significantly improved accuracy. The following embodiments are performed by a central computer server system having one or more processors executing computer readable instructions corresponding to a plurality of special purpose computer modules described in FIGS. 1-3 below.

FIG. 1 depicts an embodiment of a system 100 for extracting facts from an electronic document. Embodiments of the disclosed system may be implemented in various operating environments that include personal computers, server computers, handheld or laptop devices, multiprocessor systems, microprocessor-based systems, programmable consumer electronics, network PCs, minicomputers, mainframe computers, and distributed computing environments.

The document corpus computer module 102 may provide an input of an electronic document containing unstructured text such as, for example, a news feed article, a file from a digital library, a blog, a forum, a digital book and/or any file containing natural language text.

The process may involve crawling through document file received from the corpus 102. An electronic document may include information in unstructured text format which may be crawled using natural language processing techniques (NLP). Some NLP techniques include, for example, removing stop words, tokenization, stemming and part-of speech tagging among others known in the art.

An individual file may first go through an entity extraction computer module 104 where entities (e.g., a person, location, or organization name) are identified and extracted. Entity extraction module 104 may also include disambiguation methods which may differentiate ambiguous entities. Disambiguation of entities may be performed in order to attribute a fact to an appropriate entity. A method for entity disambiguation may include, for example, comparing extracted entities and co-occurrences with other entities or features against a knowledge base of co-occurring features in order to identify specific entities the document may be referring to. Other methods for entity disambiguation may also be used and are included within the scope of this disclosure. In an embodiment, entity extraction computer module 104 may be implemented as a hardware and/or software module in a single computer or in a distributed computer architecture.

The file may then go through a topic extractor computer module 108. Topic extractor module 108 may extract the theme or topic of a single document file. In most cases a file may include a single topic, however a plurality of topics may also exist in a single document. Topic extraction techniques may include, for example, comparing keywords against models built with a multi-component extension of latent Dirichlet allocation (MC-LDA), among other techniques for topic identification. A topic may then be appended to a fact in order to provide more accurate information.

System 100 may include a fact extractor computer module 112. Fact extractor module 112 may be a hardware and/or software computer module executing programmatic logic that may extract facts by crawling through the document. Fact extractor module 112 may compare text structures against fact models stored in a fact template store 114 in order to extract and determine the probability of an extracted fact and the associated fact type.

In the illustrated embodiment, once all features are extracted, a fact relatedness estimator computer module 116 may correlate all features in order to determine a fact relation to other features and assign a confidence score that may serve as an indication that an extracted fact is accurate. Fact relatedness estimator module 116 may calculate a confidence score based on a text distance between parts of text from where a fact was extracted and where a topic or entity was extracted. For example, consider the fact example "President said the bill will pass" extracted from a document where the identified topic was "immigration". Fact relatedness estimator module 116 may measure the distances between the fact sentence "President said the bill will pass" and the sentence from where the topic "immigration" was extracted. The shorter the distance in text, the more likelihood that the fact is indeed related to immigration. The fact relatedness estimator module 116 may also calculate confidence score by comparing co-occurring entities in the same document file. For example, considering the same example used before the entity "president" may be mentioned at different parts in the document. A co-occurrence of an entity mentioned in a fact with the same entity in a different part of the document may increase a confidence score associated with the fact. The distances between co-occurring entities in relation to facts may also be used in determining confidences scores. Distances in text may be calculated using methods such as tokenization or any other NLP methods.

Whenever the confidence score for an extracted fact exceeds a predetermined threshold, such fact may be stored in a verified fact store 118. Verified fact store 118 may be a computer database used by various applications in order to query for different facts associated with the purpose of a given application.

Those skilled in the art will realize that FIG. 1 illustrates an exemplary embodiment and is in no way limiting the scope of the invention. Additional modules for extracting different features not illustrated in FIG. 1 may also be included and are to be considered within the scope of the invention. As those of skill in the art will realize, all hardware and software modules described in the present disclosure may be implemented in a single special purpose computer or in a distributed computer architecture across a plurality of special purpose computers.

Figure 2:
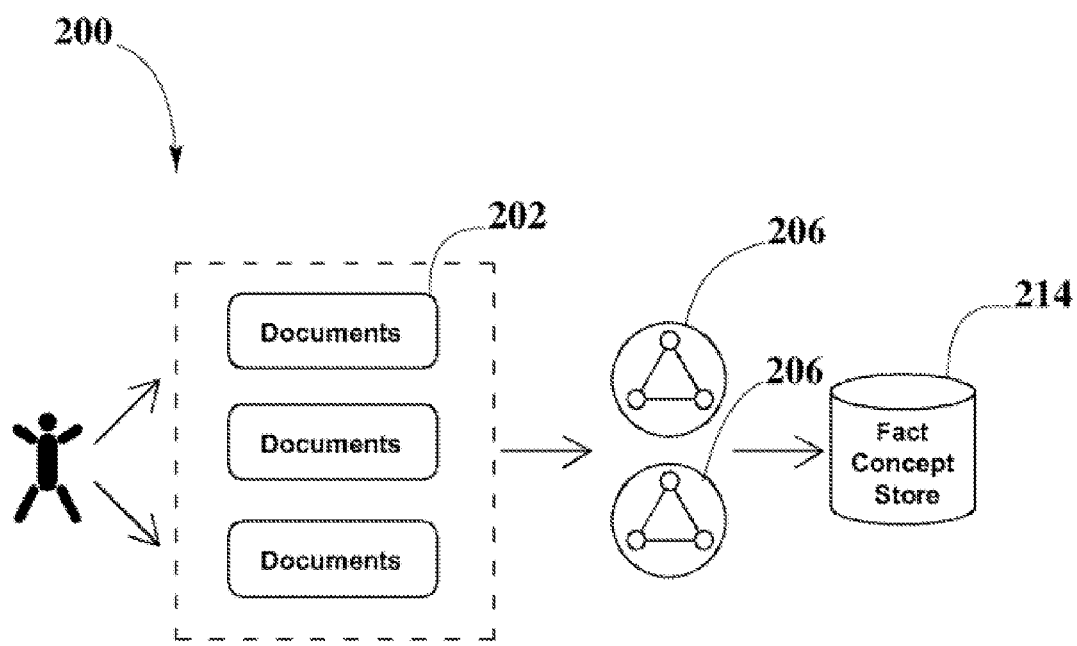
FIG. 2 is diagram of a system for training a fact concept store, according to an embodiment.

FIG. 2 is an embodiment of a training computer system 200 for building a fact template store 214. A plurality of documents 202 may be tagged, for example by a computer process, in order to identify key words pertaining to specific facts and assign weights to those keywords. For example, an embodiment of a fact template model 206 may be "The President said the bill will pass." The tagging process of the system 200 can identify, tag and record the sentence structure of the fact. In the example, to build a model the person may identify the keyword "said" preceded by an entity (e.g., the "President") and proceeded by some string (e.g., "the bill will pass") which may represent the value of the fact. The model may then be stored in fact template store 214 along with metadata such as for example, a count of how many times that sentence structure is repeated across different documents, a fact type classification, a confidence score that serves as an indication of how strongly the sentence structure may resemble a fact. Fact template models 206 may be used in subsequent text comparisons in order to extract facts from document files.

Figure 3:
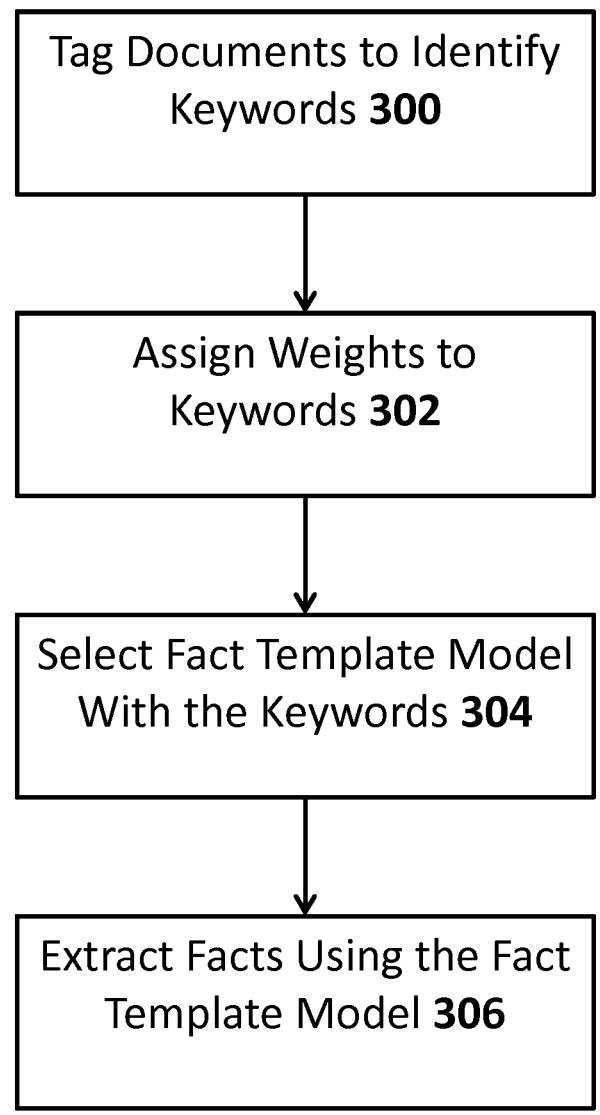
FIG. 3 is a flow chart of a method for building a fact template store of FIG. 2, according to an embodiment.

FIG. 3 is an embodiment of a method for building a fact template store of FIG. 2. In step 300, the computer system 200 (FIG. 2) tags electronic documents in a corpus of documents to identify keywords pertaining to facts. In step 302, the system 200 assigns weights to tagged keywords. In step 304, the system 200 selects a fact template model having the identified keywords (from other electronic documents in the corpus) and stores the fact template in the fact template store database along with the metadata, as discussed above in connection with FIG. 2. Finally, in step 306, the fact template model is used in text comparisons in the process of fact extraction, as discussed in FIG. 1 above.

The foregoing method descriptions and the process flow diagrams are provided merely as illustrative examples and are not intended to require or imply that the steps of the various embodiments must be performed in the order presented. As will be appreciated by one of skill in the art the steps in the foregoing embodiments may be performed in any order. Words such as "then," "next," etc. are not intended to limit the order of the steps; these words are simply used to guide the reader through the description of the methods. Although process flow diagrams may describe the operations as a sequential process, many of the operations can be performed in parallel or concurrently. In addition, the order of the operations may be re-arranged. A process may correspond to a method, a function, a procedure, a subroutine, a subprogram, etc. When a process corresponds to a function, its termination may correspond to a return of the function to the calling function or the main function.

The various illustrative logical blocks, modules, circuits, and algorithm steps described in connection with the embodiments disclosed herein may be implemented as electronic hardware, computer software, or combinations of both. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

Embodiments implemented in computer software may be implemented in software, firmware, middleware, microcode, hardware description languages, or any combination thereof. A code segment or machine-executable instructions may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, etc.

The actual software code or specialized control hardware used to implement these systems and methods is not limiting of the invention. Thus, the operation and behavior of the systems and methods were described without reference to the specific software code being understood that software and control hardware can be designed to implement the systems and methods based on the description herein.

When implemented in software, the functions may be stored as one or more instructions or code on a non-transitory computer-readable or processor-readable storage medium. The steps of a method or algorithm disclosed herein may be embodied in a processor-executable software module which may reside on a computer-readable or processor-readable storage medium. A non-transitory computer-readable or processor-readable media includes both computer storage media and tangible storage media that facilitate transfer of a computer program from one place to another. A non-transitory processor-readable storage media may be any available media that may be accessed by a computer. By way of example, and not limitation, such non-transitory processor-readable media may comprise RAM, ROM, EEPROM, CD-ROM or other optical disk storage, magnetic disk storage or other magnetic storage devices, or any other tangible storage medium that may be used to store desired program code in the form of instructions or data structures and that may be accessed by a computer or processor. Disk and disc, as used herein, include compact disc (CD), laser disc, optical disc, digital versatile disc (DVD), floppy disk, and blu-ray disc where disks usually reproduce data magnetically, while discs reproduce data optically with lasers. Combinations of the above should also be included within the scope of computer-readable media. Additionally, the operations of a method or algorithm may reside as one or any combination or set of codes and/or instructions on a non-transitory processor-readable medium and/or computer-readable medium, which may be incorporated into a computer program product.

The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A method comprising:
   receiving, by an entity extraction computer, an electronic document having unstructured text, wherein the electronic document is a text file;
   extracting, by the entity extraction computer, an entity identifier from the unstructured text in the electronic document;
   extracting, by a topic extraction computer, a topic identifier from the unstructured text in the electronic document;
   extracting, by a fact extraction computer, a fact identifier from the unstructured text in the electronic document by comparing text string structures in the unstructured text to a fact template database, wherein the fact template database having stored therein a fact template model identifying keywords pertaining to specific fact identifiers and corresponding keyword weights; and
   associating, by a fact relatedness estimator computer, the entity identifier with the topic identifier and the fact identifier to determine a confidence score indicative of a degree of accuracy of extraction of the fact identifier, wherein the confidence score is based at least in part on a spatial distance between a part of the unstructured text in the electronic document from where the fact identifier was extracted and a part of the unstructured text from where at least one of the topic identifier or the entity identifier was extracted.

2. The method of claim 1, wherein the distance in the unstructured text is calculated using tokenization.

3. The method of claim 1, wherein the confidence score is further based at least in part on comparing co-occurring entity identifiers in the electronic document.

4. The method of claim 1 wherein the fact template model includes metadata.

5. The method of claim 4 wherein the metadata includes a count of a number of times a sentence structure corresponding to the fact template model is repeated across a plurality of electronic documents.

6. The method of claim 4 wherein the confidence score is stored in the metadata.

7. A system comprising:
   one or more server computers having one or more processors executing computer readable instructions for a plurality of computer modules including:
   an entity extraction module which receives an electronic document having unstructured text and extracts an entity identifier from the unstructured text in the electronic document, wherein the electronic document is a text file;
   a topic extraction module which extracts a topic identifier from the unstructured text in the electronic document;
   a fact extraction module which extracts a fact identifier from the unstructured text in the electronic document by comparing text string structures in the unstructured text to a fact template database, wherein the fact template database having stored therein a fact template model identifying keywords pertaining to specific fact identifiers and corresponding keyword weights; and
   a fact relatedness estimator module which associates the entity identifier with the topic identifier and the fact identifier to determine a confidence score indicative of a degree of accuracy of extraction of the fact identifier, wherein the confidence score is based at least in part on a spatial distance between a part of the unstructured text in the electronic document from where the fact identifier was extracted and a part of the unstructured text from where at least one of the topic identifier or the entity identifier was extracted.

8. The system of claim 7, wherein the distance in the unstructured text is calculated using tokenization.

9. The system of claim 7, wherein the confidence score is further based at least in part on comparing co-occurring entity identifiers in the electronic document.

10. The system of claim 7 wherein the fact template model includes metadata.

11. The system of claim 10 wherein the metadata includes a count of a number of times a sentence structure corresponding to the fact template model is repeated across a plurality of electronic documents.

12. The system of claim 10 wherein the confidence score is stored in the metadata.

13. A non-transitory computer readable medium having stored thereon computer executable instructions instructive of a method comprising:
   receiving, by an entity extraction computer, an electronic document having unstructured text, wherein the electronic document is a text file;
   extracting, by the entity extraction computer, an entity identifier from the unstructured text in the electronic document;
   extracting, by a topic extraction computer, a topic identifier from the unstructured text in the electronic document;
   extracting, by a fact extraction computer, a fact identifier from the unstructured text in the electronic document by comparing text string structures in the unstructured text to a fact template database, the fact template database having stored therein a fact template model identifying keywords pertaining to specific fact identifiers and corresponding keyword weights; and
   associating, by a fact relatedness estimator computer, the entity identifier with the topic identifier and the fact identifier to determine a confidence score indicative of a degree of accuracy of extraction of the fact identifier, wherein the confidence score is based at least in part on a spatial distance between a part of the unstructured text in the electronic document from where the fact identifier was extracted and a part of the unstructured text from where at least one of the topic identifier or the entity identifier was extracted.

14. The non-transitory computer readable medium of claim 13, wherein the distance in the unstructured text is calculated using tokenization.

15. The non-transitory computer readable medium of claim 13, wherein the confidence score is further based at least in part on comparing co-occurring entity identifiers in the electronic document.

16. The non-transitory computer readable medium of claim 13 wherein the fact template model includes metadata.

17. The non-transitory computer readable medium of claim 16 wherein the metadata includes a count of a number of times a sentence structure corresponding to the fact template model is repeated across a plurality of electronic documents.

* * * * *